US012072650B2

(12) United States Patent
Imaizumi et al.

(10) Patent No.: US 12,072,650 B2
(45) Date of Patent: Aug. 27, 2024

(54) IMAGE HEATING DEVICE AND IMAGE FORMING APPARATUS

(71) Applicant: CANON KABUSHIKI KAISHA, Tokyo (JP)

(72) Inventors: Toru Imaizumi, Kanagawa (JP); Takaaki Akamatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/898,703

(22) Filed: Aug. 30, 2022

(65) Prior Publication Data

US 2023/0060287 A1 Mar. 2, 2023

(30) Foreign Application Priority Data

Aug. 31, 2021 (JP) ................................. 2021-141220

(51) Int. Cl.
*G03G 15/20* (2006.01)

(52) U.S. Cl.
CPC ................................ *G03G 15/2053* (2013.01)

(58) Field of Classification Search
CPC ....... G03G 15/2053; G03G 2215/2035; G03G 15/2025
See application file for complete search history.

(56) References Cited

U.S. PATENT DOCUMENTS

2008/0317522 A1* 12/2008 Ardery ............... G03G 15/2025 399/329
2009/0317154 A1* 12/2009 Nishinoue ............ G03G 15/206 399/329
2010/0150621 A1* 6/2010 Sugaya .............. G03G 15/2039 399/328
2010/0247186 A1* 9/2010 Tanaka ................. G03G 15/206 399/329
2013/0322936 A1* 12/2013 Yagi ................... G03G 15/2021 399/329
(Continued)

FOREIGN PATENT DOCUMENTS

JP H04204984 A 7/1992
JP 2001185328 A * 7/2001
(Continued)

OTHER PUBLICATIONS

Machine Translation of JP 2001-185328. Jul. 2001. (Year: 2001).*

*Primary Examiner* — Carla J Therrien
(74) *Attorney, Agent, or Firm* — Venable LLP

(57) ABSTRACT

An image heating device comprising: a first rotating member, a heater, a heater holder, and a second rotating member, wherein the heater holder has a flat surface portion provided downstream of the heater in a conveying direction of a recording material, the flat surface portion being in contact with the inner peripheral surface of the first rotating member, wherein the flat surface portion has a first region and a second region in a longitudinal direction, wherein the first region includes a region corresponding to a region of a nip portion through which a central portion of the recording material passes, and the second region is a region on an end portion side from the first region in the longitudinal direction, and wherein in the conveying direction, the downstream end portion of the second region is located upstream of the downstream end portion of the first region.

12 Claims, 8 Drawing Sheets

(56) References Cited

U.S. PATENT DOCUMENTS

| | | | | |
|---|---|---|---|---|
| 2016/0109834 | A1* | 4/2016 | Kadowaki .......... | G03G 15/2053 399/329 |
| 2018/0032005 | A1* | 2/2018 | Sato ................... | G03G 15/2053 |
| 2019/0302664 | A1* | 10/2019 | Morihara ........... | G03G 15/2053 |
| 2021/0072684 | A1* | 3/2021 | Doda ................. | G03G 15/2064 |

FOREIGN PATENT DOCUMENTS

| | | | |
|---|---|---|---|
| JP | 2010145592 | A | 7/2010 |
| JP | 2012123329 | A | 6/2012 |
| JP | 2012252129 | A | 12/2012 |
| JP | 2014232215 | A | 12/2014 |
| JP | 2016080989 | A | 5/2016 |
| JP | 2019028190 | A | 2/2019 |

* cited by examiner

IMAGE HEATING DEVICE AND IMAGE FORMING APPARATUS

BACKGROUND OF THE INVENTION

Field of the Invention

The present invention relates to an image heating device such as a fixing device installed in an image forming apparatus such as a copying machine, a printer, and the like using an electrophotographic method or an electrostatic recording method, or a gloss-imparting device that improves the glossiness of a toner image by reheating a fixed toner image on a recording material. The present invention also relates to an image forming apparatus provided with the image heating device.

Description of the Related Art

An image heating device of a film heating type has been known as a fixing device for use in an electrophotographic system. The image heating device of a film heating type has a heater having a resistance heating element on a ceramic substrate, a fixing film that rotates while being heated in contact with the heater, and a pressure roller that forms a nip portion together with a heater with the fixing film interposed therebetween. A toner image on a recording material is fixed to the recording material by heating the recording material that carries the unfixed toner image while being nipped and conveyed by the nip portion.

In the image heating device of a film heating type, the recording material is conveyed at a speed substantially equal to the surface speed of the rotating fixing film in most of the nip portion. However, in the vicinity of the fixing nip outlet, the recording material is released from the pressure of the fixing nip, and the locus of the fixing film changes, so that there is a difference in speed between the recording material and the fixing film. Due to this speed difference, a minute slip may occur between the surface layer of the fixing film and the surface layer of the recording material. Where the surface layer of the fixing film is rubbed and worn due to slipping, it causes flaws such as image defects. In particular, at the locations where the left and right end portions of the recording material in the width direction pass, the fixing nip pressure tends to be locally strong, so that wear is likely to be promoted.

Japanese Patent Application Publication No. 2014-232215 discloses a configuration in which wear is dispersed by moving the position of a fixing belt in the longitudinal direction (recording material width direction).

SUMMARY OF THE INVENTION

However, although it may be possible to disperse the locations affected by wear, the occurrence of wear is difficult to suppress.

Therefore, an object of the present invention is to suppress the occurrence of wear.

In order to achieve the above object, an image heating device that nips and conveys a recording material in a nip portion according to the present invention comprises:

a first rotating member capable of rotating:

a heater arranged in an internal space of the first rotating member, the heater heating the first rotating member:

a heater holder holding the heater, the heater holder being in contact with an inner peripheral surface of the first rotating member and guiding a rotation of the first rotating member; and a second rotating member that is capable of rotating and that is in contact with an outer peripheral surface of the first rotating member and forms the nip portion together the heater and the heater holder with the first rotating member interposed therebetween;

wherein the heater holder has a flat surface portion provided downstream of the heater in a conveying direction of the recording material, the flat surface portion being in contact with the inner peripheral surface of the first rotating member;

wherein the flat surface portion has a first region and a second region in a longitudinal direction orthogonal to the conveying direction;

wherein the first region includes a region corresponding to a region of the nip portion through which a central portion of the recording material passes, and the second region is a region on an end portion side from the first region in the longitudinal direction;

wherein in the conveying direction, a width of the first region is a first length, and a width of the second region is a second length shorter than the first length; and wherein in the conveying direction, a downstream end portion of the second region is located upstream of a downstream end portion of the first region.

According to the present invention, the occurrence of wear can be suppressed.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. Examples of an image forming apparatus to which the present invention can be applied include a printer, a copier, and the like using an electrophotographic method or an electrostatic recording method, and here, a case where the present invention is applied to a laser printer will be described.

Embodiment 1

The first embodiment of the present invention will be described below. First, the main body configuration of the image forming apparatus in the present embodiment will be described, and then the fixing device (image heating device) according to the present invention will be described in detail.

Image Forming Apparatus

Figure 1:
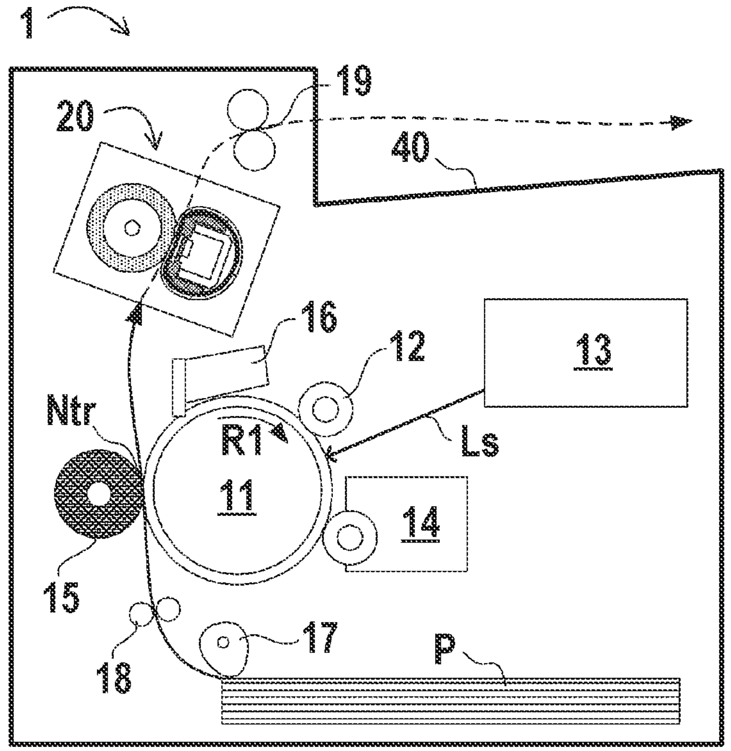
FIG. 1 is a schematic cross-sectional view showing a schematic configuration of the image forming apparatus in Embodiment 1.

An example of an image forming apparatus to which the present invention can be applied will be described with reference to a schematic cross-sectional view of an image forming apparatus 1 of the present embodiment shown in FIG. 1. The image forming apparatus 1 is an electrophotographic image forming apparatus in which a toner image on a photosensitive drum 11 is directly transferred onto a recording material P. In an image forming portion, a charger 12, an exposure device 13 that irradiates the photosensitive drum 11 with a laser beam Ls, a developing device 14, a transfer roller 15, and a photosensitive drum cleaner 16 are arranged in the order of description along the rotation direction (arrow R1 direction) on the peripheral surface of the photosensitive drum 11 which is a rotatable image bearing member.

The procedure for forming an image in the image forming apparatus 1 will be described hereinbelow. First, the surface of the photosensitive drum 11 is negatively charged by the charger 12. Next, an electrostatic latent image is formed on the surface of the charged photosensitive drum 11 by the laser beam Ls of the exposure device 13. The toner of the present embodiment is charged with a negative polarity, and the developing device 14 containing a black toner causes the toner to adhere only to the electrostatic latent image portion on the photosensitive drum 11 to form a toner image T on the photosensitive drum 11.

Where the recording material P is fed from a paper feed tray by a paper feed roller 17, the recording material is conveyed by a transfer roller 18 to a transfer nip Ntr formed by the photosensitive drum 11 and the transfer roller 15. A positive polarity transfer bias, which is the opposite polarity to the polarity of the toner, is applied to the transfer roller 15 from a power source (not shown). The toner image T on the photosensitive drum 11 is transferred onto the recording material P by the transfer bias in the transfer nip Ntr. The untransferred toner on the surface of the photosensitive drum 11 after transfer is removed by the photosensitive drum cleaner 16 having an elastic blade.

The recording material P carrying the toner image T is conveyed to a fixing device 20 as a fixing portion. When the toner image T on the surface is heat-fixed by the fixing device 20, the toner image T is fixed to the recording material P and becomes a fixed image. Then, the recording material P is sent to a paper ejection roller 19 by the conveying force of the fixing device 20 and is ejected to a paper ejection portion 40 by the paper ejection roller 19, thereby completing a series of image forming processes.

Although the image forming apparatus is described by using a monochrome laser printer using a monochrome toner of a single color as a typical example, the application of the present invention is not limited to this. For example, it is also possible to apply the present invention to an image forming apparatus such as a color laser printer of a tandem system or the like in which color toners of two or more colors are transferred onto a recording material via an intermediate transfer belt to form an image.

Fixing Device

The schematic configuration of the fixing device 20 will be described with reference to FIGS. 2A and 2B. The fixing device 20 of the present embodiment is an image heating device of a film heating type that is aimed at shortening the start-up time and reducing power consumption. In the following description, the conveying direction of the recording material P is the A direction, the longitudinal direction orthogonal to the conveying direction (recording material width direction) is the B direction, and the pressure direction of a fixing film 22 orthogonal to the conveying direction and the longitudinal direction is the C direction. The pressure direction is perpendicular to a heater sliding surface S2 of a heater 23 that slides on the fixing film 22.

Figure 2A:
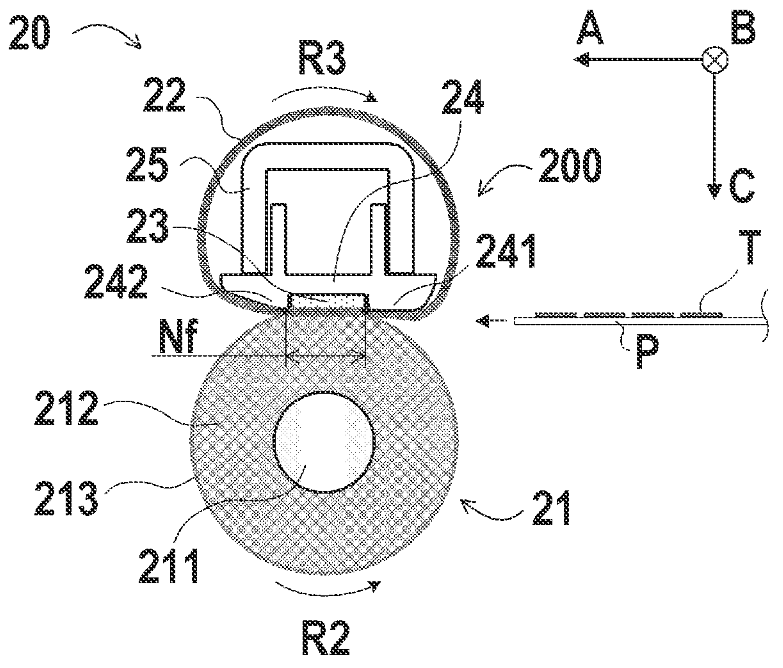
FIGS. 2A and 2B are schematic cross-sectional views showing a schematic configuration of the image heating device in Embodiment 1.
Figure 2B:
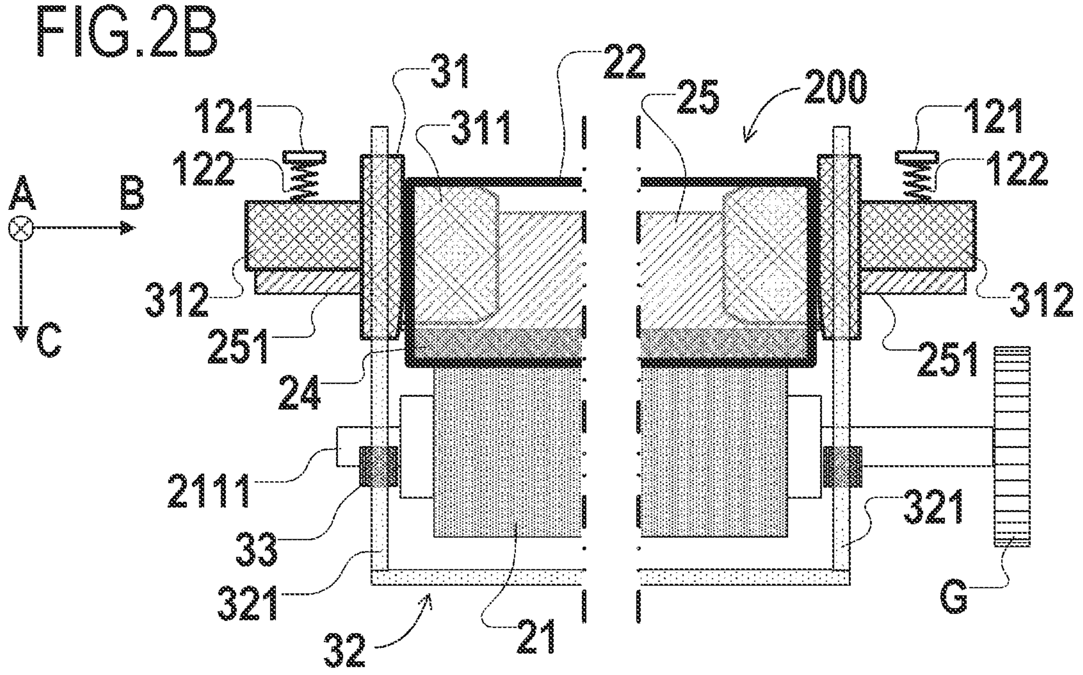

FIG. 2A is a cross-sectional view of the vicinity of the central portion of the fixing device 20 in the longitudinal direction (B direction) in the present embodiment, and FIG. 2B is a cross-sectional view through the central axis of a pressure roller 21 of the fixing device 20 as viewed from the conveying direction (A direction). The fixing device 20 which is a fixing means for the toner image has a film unit 200 including the fixing film (first rotating member) 22, the heater (second rotating member) 23, a heater holder 24, and a pressure stay 25, and the pressure roller 21. The pressure roller 21, the fixing film 22, the heater 23, the heater holder 24, and the pressure stay 25 are all members elongated in the longitudinal direction. The toner image T is heat-fixed to the recording material P in a fixing nip Nf formed by the pressure roller 21, the heater 23 and the heater holder 24 with the fixing film 22 interposed therebetween.

The pressure roller 21 has an outer diameter of Φ20 mm, and is configured of an iron core metal 211 having an outer diameter of Φ14 mm and an elastic layer 212 having a thickness of 3.0 mm. As the material of the elastic layer 212, solid rubber or foam rubber can be used. Foam rubber has an advantage that the surface temperature easily rises and the fixing start-up time can be shortened because the heat capacity and thermal conductivity are low and the heat of the surface of the pressure roller 21 is unlikely to be absorbed to the inside. In the present embodiment, foamed rubber obtained by foaming silicone rubber was used for the elastic layer 212.

On the surface layer of the elastic layer 212, a release layer 213 made of a perfluoroalkoxy resin (PFA) is further formed as a release layer for adding non-adhesiveness with respect to the toner. The release layer 213 may be obtained by covering with a tube or coating the surface with a paint, and in the present embodiment, a tube having excellent durability was used. As the material of the release layer 213, in addition to PFA, a fluororesin such as a polytetrafluoroethylene resin (PTFE) and a tetrafluoroethylene-hexafluoropropylene resin (FEP), and fluororubber and silicone rubber having good releasability, and the like may be used. The lower the surface hardness of the pressure roller 21, the lighter the pressure at which the width of the fixing nip Nf can be obtained, but the surface hardness needs to be determined in consideration of durability. In this example, a material with an Asker-C hardness (4.9 N load) of 50° was used.

The fixing film 22 has an outer diameter of Φ18 mm in an unloaded cylindrical state in which the film is not deformed and has a multi-layer structure having a plurality of layers in the thickness direction. The fixing film 22 has at least a base layer for maintaining the strength of the film and a release layer for reducing stain adhesion to the surface.

The base layer of the fixing film 22 needs to have heat resistance because it receives the heat of the heater 23 and needs to have strength because it slides on the heater 23. Therefore, a metal such as stainless steel or nickel or a heat-resistant resin such as a polyimide is preferably used as the material of the base layer. In the present embodiment, a polyimide resin was used as the material of the base layer of the fixing film 22, and a carbon-based filler was added to improve the thermal conductivity and strength. The thinner the base layer, the easier it is to transfer the heat of the heater 23 to the surface of the recording material P, but the strength is thereby lowered. The thickness of the base layer is preferably about 15 μm to 100 μm, and in the present embodiment, the thickness is set to 60 μm.

The release layer, which is the outer peripheral surface of the fixing film 22, is for adding non-adhesiveness with respect to the toner. A fluororesin such as PFA. PTFE, FEP, or the like is preferably used as the material of the release layer. In the present embodiment, PFA having excellent releasability and heat resistance was selected among the fluororesins. The release layer may be obtained by covering with a tube or coating the surface with a paint. In the present embodiment, the release layer was formed by a coat excellent in thin-wall molding. The thinner the release layer, the easier it is to transfer the heat of the heater 23 to the surface of the fixing film 22, but if the release layer is too thin, the durability deteriorates. The thickness of the release layer is preferably about 5 μm to 30 μm, and in the present embodiment, the thickness was 10 μm. Further, although not used in the present embodiment, an elastic layer may be provided between the base layer and the release layer. In that case, it is preferable to use silicone rubber, fluorine rubber, or the like as the material of the elastic layer.

The heater 23 is a typical heater used in a fixing device of a film heating type, and uses a ceramic substrate provided with a resistance heating element. In the heater 23, a Ag/Pd (silver-palladium) resistance heating element is coated on the surface of an alumina substrate having a width of 6 mm and a thickness of 1 mm in the recording material conveying direction by screen printing to a thickness of several microns, and glass is covered thereon to a thickness of 60 μm to protect the resistance heating element and ensure slidability. The temperature of the heater 23 is adjusted by controlling, as appropriate, the current flowing through the resistance heating element according to the signal of a temperature detecting element (not shown) that detects the temperature of the ceramic substrate or the fixing film 22. The heater 23 is provided in the internal space of the fixing film 22, is fitted into a groove-shaped holding portion provided in the heater holder 24 and is fixedly supported. In the present embodiment, the center of the heater 23 in the recording material conveying direction (A direction) is arranged at a position 0.4 mm upstream of the center of the pressure roller 21 in the conveying direction.

The heater holder 24 for holding the heater 23 is provided on the inner peripheral side of the fixing film 22. The heater holder 24 has a gutter-shaped cross section of a substantially semicircular arc shape, and the fixing film 22 is loosely externally fitted thereon. Since the heater holder 24 is required to have heat resistance and rigidity, it is made of a liquid crystal polymer resin having high heat resistance and excellent strength. In the present embodiment, Sumika Super (registered trademark) manufactured by Sumitomo Chemical Co., Ltd. is used as the liquid crystal polymer resin. The heater holder 24 not only holds the heater 23, but also has a role of guiding the rotation of the fixing film 22 by an upstream guide portion 241 and a downstream guide portion 242 provided on the upstream and downstream sides in the conveying direction of the heater 23. The downstream guide portion 242, which is a characteristic configuration of the present invention, will be described in detail hereinbelow.

The pressure stay 25 is arranged along the longitudinal direction of the heater holder 24. The pressure stay 25 is formed by bending a highly rigid sheet metal such as stainless steel in order to uniformly pressurize the heater holder 24 in the longitudinal direction. The pressure stay 25 increases bending rigidity and reinforces the heater holder 24.

As shown in FIG. 2B, fixing flanges 31 (regulating members) are fitted to arm portions 251 provided at both ends of the pressure stay 25 in the longitudinal direction. The fixing flanges 31 regulate the movement of the fixing film 22 in the longitudinal direction and guide the movement in the rotation direction. The film unit 200 is arranged substantially parallel to the upper side of the pressure roller 21 with the heater 23 side facing downward so that the heater 23 faces the pressure roller 21. The left and right fixing flanges 31 are each provided with a vertical groove portion, and the fixing flange 31 is supported by the side plate 321 by engaging vertical wall portions with vertical edge portions of vertical guide slits provided on the left and right side plates 321. In the present embodiment, a liquid crystal polymer resin is used as the material of the fixing flange 31. Further, a core metal shaft portion 2111 of the pressure roller 21 is installed on a bearing member 33 engaged with the left and right side plates 321 of an apparatus frame 32.

Pressure springs 122 are provided in a compressed state between pressure portions 312 of the left and right fixing flanges 31 and pressure spring support portions 121. Due to the elastic force of the pressure springs 122, the heater 23 is pressed by a predetermined pressing force against the upper surface of the pressure roller 21 through the left and right fixing flanges 31, the pressure stay 25, and the heater holder 24 while nipping the fixing film 22. In the present embodiment, the pressure of the pressure springs 122 is set so that the pressing force of the fixing film 22 and the pressure roller 21 is 15 kg. Further, in the present embodiment, a part of the downstream guide portion 242 of the heater holder 24 is also pressed against the pressure roller 21 with the fixing film 22 interposed therebetween. The details of the configuration in which the heater holder 24 and the heater 23 form the pressure roller 21 and the fixing nip Nf with the fixing film 22 interposed therebetween will be described in detail hereinbelow. In the fixing nip Nf, the fixing film 22 is nipped between the heater 23 and the pressure roller 21 and bends following the flat surface of the lower surface of the heater 23, and the inner peripheral surface of the fixing film 22 is in close contact with the flat surface of the lower surface of the heater 23. Further, a film regulating portion 311 of the fixing flange 31 on which the fixing film 22 is externally fitted is formed to have a shape that follows the natural shape formed when the fixing film 22 is pressed in the fixing nip Nf.

During the fixing operation of fixing an image on the recording material P, a rotational force is transmitted from a drive mechanism portion (not shown) to a drive gear G that drives the pressure roller 21, and the pressure roller 21 is rotationally driven at a predetermined speed in the direction of arrow R2 shown in FIG. 2A. Along with the rotational drive of the pressure roller 21, a rotational force acts on the fixing film 22 due to the frictional force acting between the pressure roller 21 and the fixing film 22 in the fixing nip Nf. While the inner peripheral surface of the fixing film 22 slides in close contact with the lower surface of the heater 23, the inner peripheral surface is guided by the heater holder 24 and rotates following the rotation of the pressure roller 21 in the direction of arrow R3 shown in FIG. 2A. In the configuration of the present embodiment, the rotation is at a surface moving speed of 200 mm/sec. A lubricant having excellent heat resistance is applied to the inner peripheral surface of the fixing film 22, and the slidability between the heater 23 and the heater holder 24 and the inner peripheral surface of the fixing film 22 is ensured. In the present embodiment, a fluorine-based grease was used as the lubricant. Specifically, a grease obtained by using perfluoropolyether (PFPE) oil as the base oil and mixing with polytetrafluoroethylene (PTFE) powder as a conditioning agent was used.

The heater 23 generates heat and raises the temperature under control by an energization control portion (not shown). When the temperature of the heater 23 rises to the set temperature and the rotation speed of the fixing film 22 determined by the rotation of the pressure roller 21 becomes steady, the recording material P carrying the unfixed toner image T is introduced into the fixing nip Nf. The recording material P is nipped and conveyed by the fixing film 22 and the pressure roller 21 at the fixing nip Nf. In the transfer process, the heat of the heater 23 is applied to the unfixed toner image on the recording material P through the fixing film 22, and the pressure is applied by the nip portion, so that the toner image T is heated and fixed on the surface of the recording material P.

Detailed Configuration of Heater Holder

Figure 3:
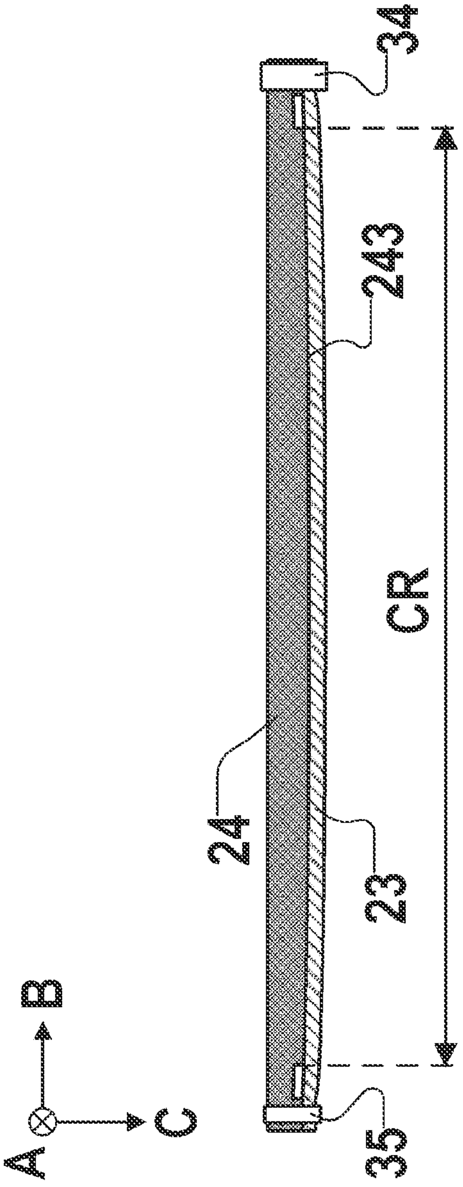
FIG. 3 is a schematic diagram showing the crown shape of a heater holder in Embodiment 1.

The configuration of the heater holder 24, which is a feature of the present invention, will be described in detail with reference to FIGS. 3 to 6B. FIG. 3 is a schematic view of the heater holder 24 as viewed from the conveying direction (A direction). The heater holder 24 of the present embodiment has a crown shape in which the central portion in the longitudinal direction of a seat surface 243 supporting the heater 23 protrudes toward the pressure roller 21 as compared with the end portions in the longitudinal direction. The heater 23 is held by a heater power feeding portion 34 and a heater clip 35 at both ends in the longitudinal direction and is provided so as to be curved along the seat surface 243 of the heater holder 24 in the longitudinal direction. The crown shape has a gentle quadratic curved shape in a region CR having a width in the longitudinal direction of 225 mm corresponding to the position facing the pressure roller 21, and the central portion in the longitudinal direction protrudes 0.4 mm with respect to the end portions in the longitudinal direction. Since the heater holder 24 is formed to have the crown shape, when the film unit 200 and the pressure roller 21 are pressed and the pressure stay 25 and the core metal 211 of the pressure roller 21 are bent and deformed, the fixing nip Nf having a uniform width is formed along the longitudinal direction. With the above configuration, the width of the fixing nip Nf in the conveying direction in the present embodiment is uniformly formed to be 6.2 mm in the longitudinal direction.

Figure 4A:
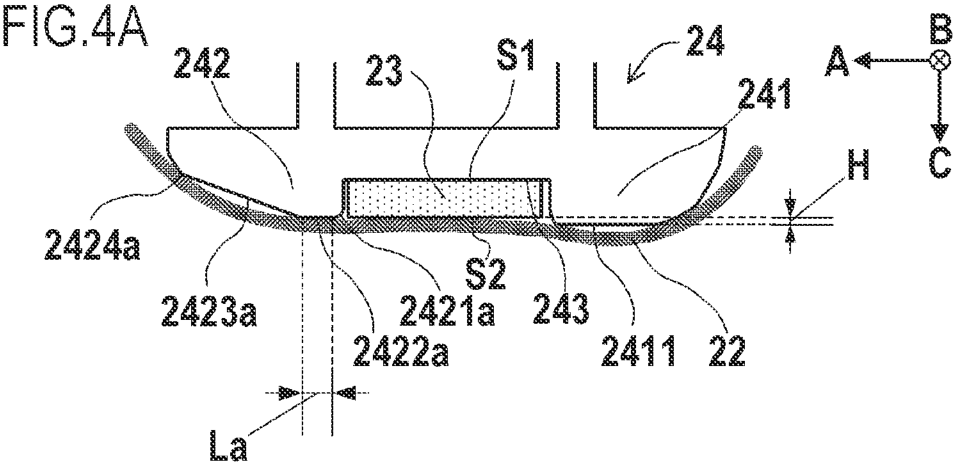
FIGS. 4A and 4B are schematic cross-sectional views of the vicinity of the fixing nip of the heater holder in Embodiment 1.
Figure 4B:
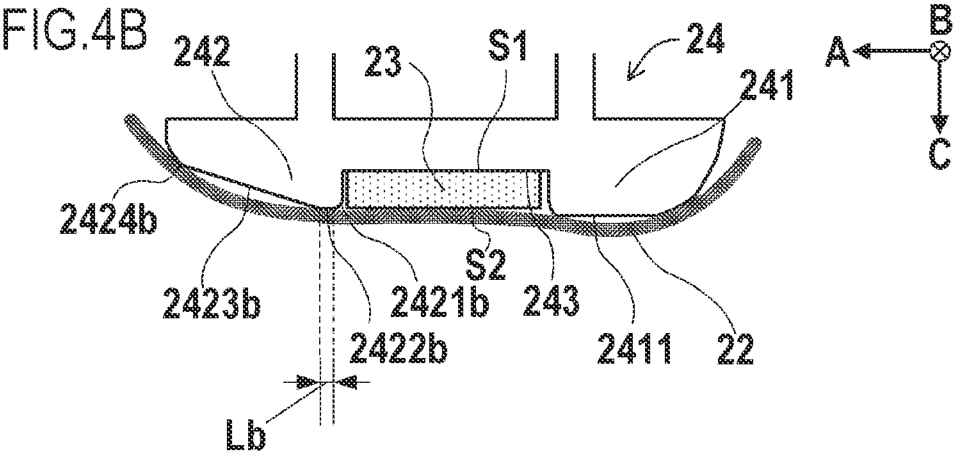

FIG. 4A is a cross-sectional view showing the vicinity of the fixing nip Nf in the central portion of the film unit 200 in the longitudinal direction, and FIG. 4B is a cross-sectional view showing the vicinity of the fixing nip Nf at the ends of the film unit 200 in the longitudinal direction. The heater 23 is in contact with the seat surface 243 of the heater holder 24 at a heater seat surface S1 and with the inner peripheral surface of the fixing film 22 at a heater sliding surface S2 (rotating member contact surface) opposite to the heater seat surface S1. In the present embodiment, the heater 23 is in direct contact with the inner peripheral surface of the fixing film 22, but a heat conductive member or the like may be provided therebetween.

The heater holder 24 has the upstream guide portion 241 protruding toward the pressure roller 21 side (second rotating member side) with respect to the heater seat surface S1 on the upstream side of the heater 23 in the conveying direction. The upstream guide portion 241 further has a protruding portion 2411 protruding toward the pressure roller 21 with respect to the heater sliding surface S2. The protruding portion 2411 preferably projects toward the pressure roller 21 with respect to the heater sliding surface S2 in order to regulate the locus of the fixing film 22 and prevent the fixing film 22 from coming into contact with the edge portion of the heater 23. However, where the protrusion amount is too large, the protruding portion 2411 becomes a factor that prevents the recording material P from entering the fixing nip. Therefore, it is desirable that the protrusion height H from the heater sliding surface S2 to the protruding portion 2411 be about 0.1 to 1.0 mm. In the present embodiment, the protrusion height H is set to 0.2 mm.

The shape of the downstream guide portion 242 of the heater holder 24 and the positional relationship between the downstream guide portion 242 and the downstream end portion of the fixing nip Nf, which are the features of the present invention, will be described hereinbelow. The heater holder 24 has the downstream guide portion 242 protruding toward the pressure roller side from the heater seat surface S1 downstream of the heater 23 in the recording material conveying direction. In the longitudinal region where the recording material P is conveyed, the heater 23 is positioned in the conveying direction by positioning portions provided at both end portions of the heater holder 24 in the longitudinal direction. In the present embodiment, the downstream guide portion 242 is formed with a gap of 0.05 mm from the position of the downstream end portion of the heater 23.

The downstream guide portion 242 has an R portion 2421 formed over the entire region in the longitudinal direction, a flat surface portion 2422, a slope portion 2423, and a rotation guide portion 2424. In the explanation hereinbelow, among the elements constituting the downstream guide portion 242, those located at the central portion in the longitudinal direction are provided with a subscript a, and those located at the end portion in the longitudinal direction are provided with a subscript b. The subscripts will be omitted if the portions are not required to be explained distinctly from each other.

The R portion 2421 is provided at a position close to the heater 23 in order to smoothly guide the recording material P, which is nipped and conveyed between the heater 23 and the pressure roller 21 with the fixing film 22 interposed therebetween, between the flat surface portion 2422 and the pressure roller 21. In the present embodiment, the R portion 2421 is a curved surface having an R of 0.3 mm and is formed over the entire region in the longitudinal direction in which the recording material P is conveyed. The flat surface portion 2422 extends downstream from the R portion 2421. The upstream end of the flat surface portion 2422 is located 0.35 mm (gap 0.3 mm+R portion 0.5 mm) downstream of the downstream end portion of the heater 23.

The flat surface portion 2422 is connected to the R portion 2421 and extends in parallel with the heater sliding surface S2. That is, the flat surface portion 2422 is provided to be adjacent to the heater sliding surface S2 on the downstream side in the conveying direction. The upstream side of the flat surface portion 2422 in the conveying direction forms the fixing nip Nf together with the pressure roller 21 with the fixing film 22 interposed therebetween, in the same manner as the heater sliding surface S2 of the heater 23. It is desirable that the flat surface portion 2422 be flush with the heater sliding surface S2 or have a lower height (on the side away from the pressure roller 21) so that the tip of the recording material P does not interfere with the downstream guide portion 242. Meanwhile, where the flat surface portion 2422 is too low with respect to the heater sliding surface S2, the inner peripheral surface of the fixing film 22 may interfere with the edge of the heater 23, so it is desirable that the difference in height be about 0.5 mm or less. This value can be changed, as appropriate, according to the material and configuration of each component. In the configuration of the present embodiment, the height from the heater seat surface S1 to the flat surface portion 2422 is 1.06 mm, and the flat surface portion 2422 is flush with the heater sliding surface S2.

Further, in the heater holder 24 of the present embodiment, the width of a flat surface portion 2422*a* in the conveying direction at the central portion of the heater holder 24 in the longitudinal direction is formed by a first length La. and the width of a flat surface portion 2422*b* in the conveying direction at the end portion in the longitudinal direction is formed by a second length Lb smaller than the first length La. The first length La is 0.8 mm and the second length Lb is 0.3 mm, each of which being formed to be constant in the longitudinal direction. That is, the flat surface portion 2422*b* at the end portion in the longitudinal direction is formed to be 0.5 mm narrower than the flat surface portion 2422*a* at the central portion in the longitudinal direction. In the conveying direction, the positions of the upstream ends of the flat surface portion 2422*a* and the flat surface portion 2422*b* are the same, and the downstream end portion of the flat surface portion 2422*b* is located upstream of the position of the downstream end portion of the flat surface portion 2422*a*.

The slope portion 2423 is inclined and extends linearly from the flat surface portion 2422. The rotation guide portion 2424 is in contact with the inner peripheral surface of the fixing film 22 downstream of the flat surface portion 2422 in the rotation direction of the fixing film 22 and guides the rotation of the fixing film 22. That is, the fixing film 22 is configured to be in contact with the flat surface portion 2422 and the rotation guide portion 2424 of the heater holder 24, but not with the slope portion 2423. By connecting the flat surface portion 2422 and the rotation guide portion 2424 by a flat surface instead of a curved surface, the fixing film 22 can be easily and rapidly separated from the recording material P in the vicinity of the downstream end portion of the flat surface portion 2422. In the present embodiment, the slope portion 2423 extending linearly is provided as a non-contact portion that does not actively come into contact with the fixing film 112, but the present configuration is not limiting. For example, the shape may be such that the space between the flat surface portion 2422 and the rotation guide portion 2424 is recessed inward.

Figure 5A:
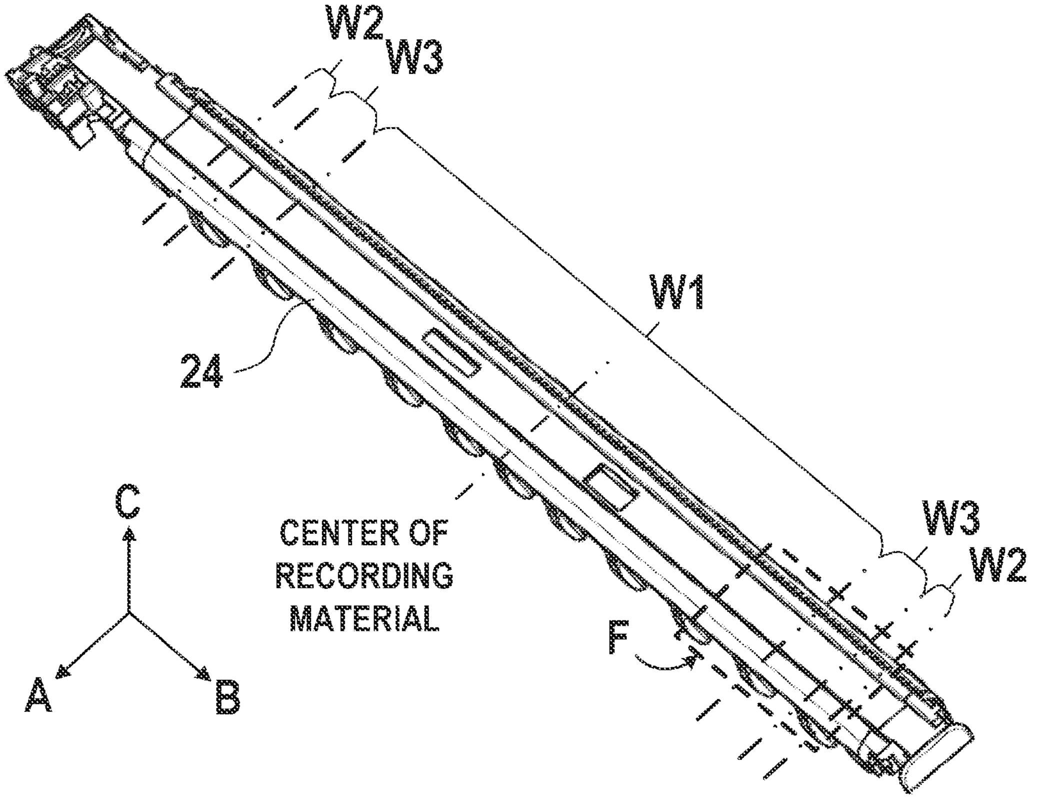
FIGS. 5A and 5B are schematic diagrams showing the heater holder in Embodiment 1.
Figure 5B:
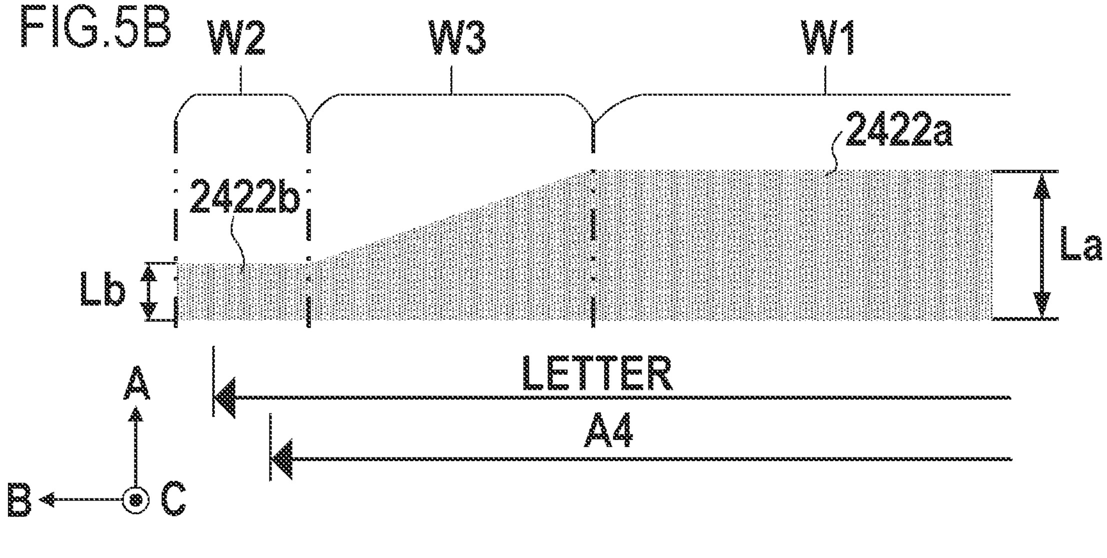

FIG. 5A is a perspective view of the heater holder 24 as viewed from the lower surface side where the heater 23 is held, and FIG. 5B shows the flat surface portion 2422 in a rectangular region F surrounded by a broken line shown in FIG. 5A. As shown in FIG. 5A, the heater holder 24 can be roughly divided into a first region W1, a second region W2, and a third region W3 in the longitudinal direction. The first region W1 including the central portion of the heater holder 24 in the longitudinal direction is in the range of −88 mm to +88 mm from the position where the central portion of the recording material P in the width direction shown by the center line (dashed-dotted line) in FIG. 5A passes. That is, the first region W1 is a region through which the central portion of the recording material P in the width direction passes. The cross-sectional shape of the downstream guide portion 242 in the first region W1 is the same as that in FIG. 4A, and the flat surface portion 2422*a* is formed with the first length La.

The second region W2, which is located closer to the end portion side in the longitudinal direction than the first region W1 and through which the end portion of the recording material P in the width direction passes, is within the range of −103 mm to −110 mm and +103 mm to +110 mm with respect to the position through which the center portion of the recording material in the width direction passes. That is, the second region W2 includes a region through which one end of the recording material P in the width direction passes and a region through which the other end on the opposite side to the one end passes. The cross-sectional shape of the downstream guide portion 242 in the second region W2 is the same as that in FIG. 4B, and the flat surface portion 2422*b* is formed with a width Lb. As shown in FIG. 5B, the heater holder 24 is arranged so that both end portions of the A4 paper in the width direction and both end portions of the LTR paper in the width direction pass through the second region W2.

The third region W3 connects the first region W1 and the second region W2 and is in the range of −88 mm to −103 mm and +88 mm to +103 mm with respect to the position where the central portion in the width direction passes. In the third region W3, the width of the flat surface portion 2422 of the downstream guide portion 242 in the conveying direction gradually decreases from the central portion in the longitudinal direction toward the end portion in the longitudinal direction.

The positional relationship between the fixing nip Nf and the downstream guide portion 242 will be described in detail hereinbelow. In the fixing device 20 of the present embodiment, not only the heater 23 but also a part of the flat surface portion 2422 of the heater holder 24 forms the fixing nip Nf together with the pressure roller 21 with the fixing film 22 interposed therebetween. The downstream end portion of the fixing nip Nf in the conveying direction is located in the flat surface portion 2422 of the downstream guide portion 242 and is configured so as not to protrude to the slope portion 2423.

Figure 6A:
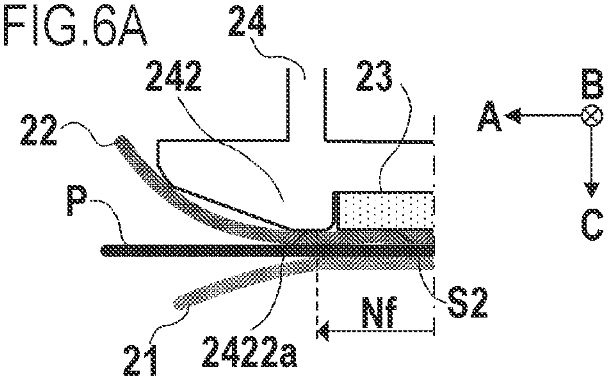
FIGS. 6A and 6B are schematic views showing the downstream side of the fixing nip in Embodiment 1.
Figure 6B:
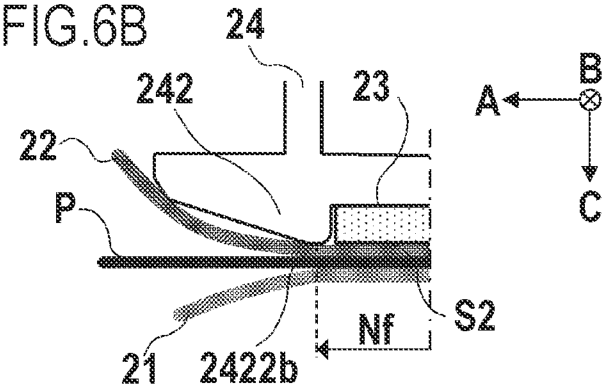

FIG. 6A is an enlarged cross-sectional view showing the vicinity of the downstream end portion of the fixing nip Nf in the first region W1, and FIG. 6B is an enlarged cross-sectional view showing the vicinity of the downstream end portion of the fixing nip Nf in the second region W2. The width of the fixing nip Nf in the recording material conveying direction in the present embodiment is 6.2 mm as described above, and the downstream end portion of the fixing nip Nf is located 0.5 mm downstream of the downstream end portion of the heater 23. Meanwhile, the distance from the downstream end portion of the heater 23 to the upstream end portion of the flat surface portion 2422 is 0.35 mm. That is, a 0.15 mm section of the downstream end portion of the fixing nip Nf is formed by the flat surface portion 2422 coming into contact with the pressure roller 21 with the fixing film 22 interposed therebetween. The fixing device 20 of present invention is configured such that the position of the downstream end portion of the fixing nip Nf is located in the flat surface portion 2422 in the entire range in the longitudinal direction including the flat surface portion 2422*a* of the first region W1 and the flat surface portion 2422*b* of the second region W2.

Effect of Present Embodiment

The action produced by the above-mentioned configuration to suppress surface wear at the position of the fixing film 22 where the end portion of the recording material P in the width direction passes will be described hereinbelow.

First, the effect of suppressing the wear of the fixing film 22 by the configuration in which the second length Lb of the flat surface portion 2422*b* of the second region W2 is smaller than the first length La of the flat surface portion 2422*a* of the first region W1 will be explained.

On the downstream side of the fixing nip Nf, there is a region of the flat surface portion 2422 that does not come into contact with the pressure roller 21. In such a region, the recording material P is not nipped between the fixing film 22 and the pressure roller 21, but since the recording material P has a certain rigidity, it is discharged straight from the fixing nip Nf. As a result, the recording material P comes into contact with the fixing film 22 even on the downstream side of the fixing nip Nf, and the wear of the surface layer of the fixing film 22 is likely to be promoted, in particular, in a region through which the left and right end portions of the recording material P where the fixing nip pressure becomes strong pass.

In the present embodiment, the second length Lb of the flat surface portion 2422*b* of the second region W2 is smaller than the first length La of the flat surface portion 2422*a* of the first region W1. With this configuration, the locus in the vicinity of the downstream guide portion 242 that is drawn by the fixing film 22 in the second region W2 shown in FIG. 6B that rotates along the heater holder 24 passes on the inside with respect to the locus drawn by the fixing film 22 in the first region W1 shown in FIG. 6A. That is, by changing the width of the flat surface portion 2422 in the longitudinal direction, the locus drawn by the fixing film 22 is changed, and the position through which the surface layer of the fixing film 22 passes is changed.

By changing the position where the surface layer of the fixing film 22 passes so that the surface layer passes more on the inside, the surface layer of the fixing film 22 can be easily and quickly separated from the surface of the recording material P on the downstream side of the pressure region created by the pressure roller 21. Therefore, since the region where a minute slip is generated between the fixing film 22 and the recording material P becomes small, it is possible to suppress the wear of the surface layer of the fixing film 22 at the left and right end portions of the recording material P. In the present embodiment, the second region W2 is formed so that the effect can be obtained when the A4 paper or the letter paper that is most often used in the market is passed through, but the second region W2 can be also provided to target narrow standard paper or the like.

Next, the effect of suppressing the wear of the fixing film 22 by the configuration in which the downstream end portion of the fixing nip Nf is located in the flat surface portion 2422, and the fixing nip Nf is not formed downstream of the flat surface portion 2422 will be explained.

In the present embodiment, since the flat surface portion 2422 also forms the fixing nip Nf with the pressure roller 21, the direction and locus of the recording material P discharged from the fixing nip Nf change depending on the shape and arrangement position of the flat surface portion 2422. The heater holder 24 is formed so that the second length Lb of the flat surface portion 2422*b* in the second region W2 is smaller than the first length La of the flat surface portion 2422*a* in the first region W1. Meanwhile, when a large-sized paper such as LTR paper or A4 paper is passed as the recording material P, the recording material P is conveyed at a uniform speed and locus in the entire range in the longitudinal direction (width direction) due to the rigidity of the recording material P. In the present embodiment, since the first region W1 occupies most of the width of the large-sized paper, the recording material P is conveyed at the speed and locus of the first region W1. Then, as shown in FIGS. 6A and 6B, the recording material P is discharged straight from the fixing nip Nf in a direction parallel to the heater sliding surface S2 and the flat surface portion 2422.

Figure 7:
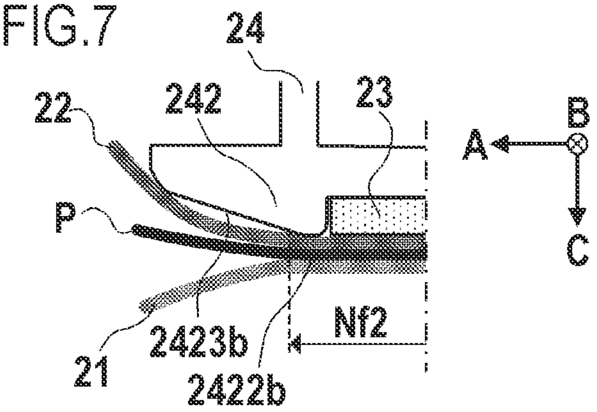
FIG. 7 is a schematic diagram showing a case where the recording material is not discharged straight from the fixing nip.

FIG. 7 is a schematic view showing the locus of the recording material P when the downstream end portion of the fixing nip Nf protrudes downstream from the flat surface portion 2422 and is located in the region where the slope portion 2423 is provided. Where the position of the downstream end portion of the fixing nip Nf2 reaches the slope portion 2423*b* in the second region W2, the recording material P is pressed from the pressure roller 21, stiffened and discharged toward the fixing film 22 side. As a result, since the recording material P is discharged with a curvature near the outlet of the fixing nip Nf2, a speed difference occurs between the fixing film 22 and the recording material P. The speed difference between the fixing film 22 and the recording material P causes rubbing between the fixing film 22 and the recording material P and wears the surface layer of the fixing film 22. Therefore, by using the configuration in which the downstream end portion of the fixing nip is located in the flat surface portion over the entire range in the longitudinal direction as in the present embodiment, the recording material is discharged straight from the fixing nip and the wear of the surface layer of the fixing film can be suppressed.

As described above, in the present embodiment, the first length La of the flat surface portion 2422*a* of the first region W1 is 0.8 mm, and the second length Lb of the flat surface portion 2422*b* of the second region W2 is 0.3 mm. When the width of the flat surface portion 2422 is too small, the fixing nip Nf is formed beyond the flat surface portion 2422, and the recording material P is stiffened and discharged, so that the wear of the fixing film 22 is promoted. Meanwhile, when the width of the flat surface portion 2422 is too large, the portion of the flat surface portion 2422 where the fixing nip Nf is not formed becomes large, and the range in which the recording material P slips increases, so that the wear of the fixing film 22 is promoted. Therefore, in the present embodiment, it is preferable that the first length La of the flat surface portion 2422*a* of the first region W1 be set within the range of 0.3 mm to 1.5 mm, and the second length Lb of the flat surface portion 2422*b* of the second region W2 be set within the range of 0.2 mm to 1.4 mm. This value may vary depending on the material and configuration of each component.

As described above, according to the present invention, it is possible to suppress the wear of the surface layer of the fixing film at the positions corresponding to the left and right end portions of the recording material with an inexpensive and simple configuration without increasing the size of the image forming apparatus. Moreover, since it is not necessary to provide a new drive mechanism or control mechanism, there is no significant cost increase.

Embodiment 2

The second embodiment of the present invention will be described below. In Embodiment 2, only the arrangement position of the film regulating portion of the fixing flange 31 that regulates the locus of the fixing film 22 at the end portions in the longitudinal direction is different from Embodiment 1. The description of configurations same as those of Embodiment 1, such as the detailed configuration of the image forming apparatus and the fixing device, will be omitted.

Features of Present Embodiment

Figure 8A:
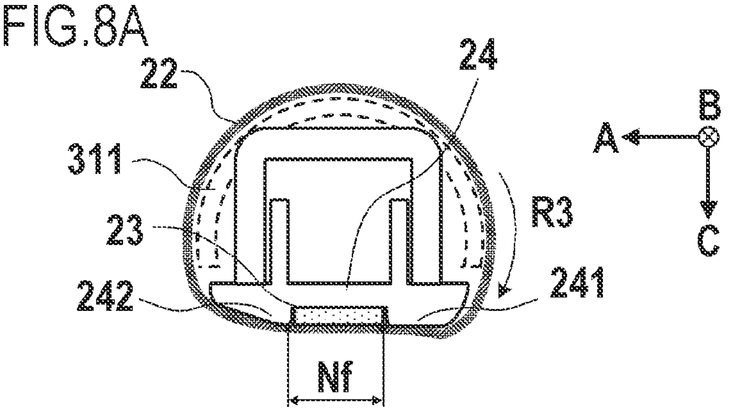
FIGS. 8A and 8B are schematic diagrams illustrating the position of the film regulating portion in Embodiment 2.

The arrangement position of the film regulating portion of the fixing flanges 31, which is a feature of the present embodiment, will be described with reference to FIGS. 8A and 8B. FIG. 8A shows the position of the film regulating portion 311 of Embodiment 1. In Embodiment 1, the fixing flange 31 is provided at both ends of the fixing film 22 in the longitudinal direction so that the fixing film 22 is pressed in the fixing nip Nf and the film regulating portion 311 follows the natural shape of the fixing film 22 formed along the heater 23 and the heater holder 24. That is, in Embodiment 1, the locus drawn by the rotation of the fixing film 22 is almost the same regardless of whether the film regulating portion 311 is provided or not.

Figure 8B:
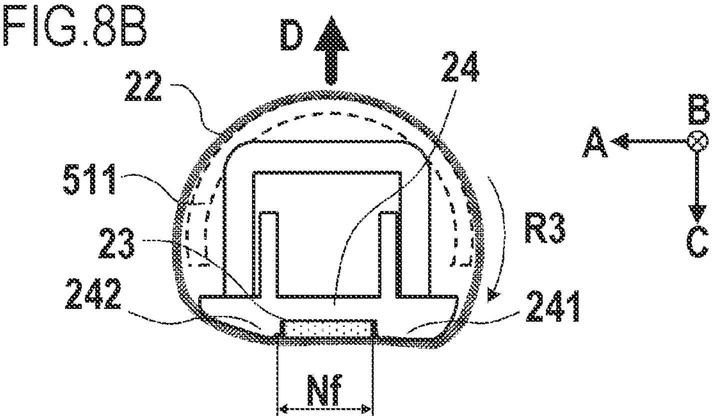

FIG. 8B shows the position of a film regulating portion 511 of Embodiment 2. In the present embodiment, as shown in FIG. 8B, the position of the film regulating portion 511 is arranged away from the fixing nip Nf in the direction of arrow D in FIG. 8B from the fixing nip Nf with respect to that in Embodiment 1, thereby changing the locus drawn by the rotating fixing film 22. Specifically, in the present embodiment, as compared with Embodiment 1, the position of the film regulating portion is arranged to be separated from the fixing nip Nf by 0.6 mm. That is, the locus drawn by the fixing film 22 of Embodiment 2 has a shape closer to a vertically long ellipse than the natural shape formed by the fixing nip Nf.

Effect of Present Embodiment

An additional effect of suppressing the surface wear of the fixing film 22 exerted in the present embodiment will be described hereinbelow. In the present embodiment, the locus of the fixing film 22 has a shape that is raised in the direction of arrow D in FIG. 8B as compared with Embodiment 1, in particular, at both ends in the longitudinal direction. By doing so, the fixing film 22 in the second region W2 draws a locus such that when the recording material P is passed, the fixing film quickly separates from the recording material P after the pressure region created by the fixing nip Nf ends. By this action, the region where the surface layer of the fixing film 22 and the recording material P minutely rub against each other can be made smaller. Therefore, as compared with Embodiment 1, an additional effect of suppressing the wear of the surface layer of the fixing film 22 at the position where the left and right end portions of the recording material P pass can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-141220, filed on Aug. 31, 2021, which is hereby incorporated by reference herein in its entirety.

What is claimed is:

1. An image heating device that nips and conveys a recording material in a nip portion, the image heating device comprising:

a first rotating member capable of rotating;

a heater arranged in an internal space of the first rotating member, the heater heating the first rotating member;

a heater holder holding the heater, the heater holder being in contact with an inner peripheral surface of the first rotating member and guiding a rotation of the first rotating member; and a second rotating member that is capable of rotating and that is in contact with an outer peripheral surface of the first rotating member and forms the nip portion together the heater and the heater holder with the first rotating member interposed therebetween;

wherein the heater includes a heater seat surface contacting a seat surface of the heater holder and a heater sliding surface opposite to the heater seat surface and contacting the inner peripheral surface of the first rotating member, wherein the heater holder includes:

a flat surface portion protruding towards the second rotating member with respect to the heater seat surface on a downstream side of the heater sliding surface in a conveying direction of the recording material, which is flush with the heater sliding surface or is more distant from the second rotating member than the heater sliding surface and extends in parallel with the heater sliding surface; and a slope portion provided on the downstream side in the conveying direction of the flat surface portion, wherein the flat surface portion includes:

a first region which is a center portion of the heater holder in a longitudinal direction orthogonal to the conveying direction, a width of the first region in the conveying direction is a first length;

a second region located closer to an end portion of the heater in the longitudinal direction with respect to the first region and through which an end of the recording material in the longitudinal direction passes, a width of the second region in the conveying direction is a second length which is shorter than the first length, and a third region located between the first region and the second region, a width of the third region in the conveying direction gradually decreases with a transition from the first region to the second region, and wherein a position of a downstream end of the nip portion is located in the flat surface portion in an entire range in the longitudinal direction including the first region and the second region.

2. The image heating device according to claim 1, wherein an upstream side of the flat surface portion in the conveying direction forms the nip portion together with the second rotating member with the first rotating member interposed therebetween.

3. The image heating device according to claim 2, wherein the first length is in a range of 0.3 mm to 1.5 mm, and wherein the second length is in a range of 0.2 mm to 1.4 mm.

4. The image heating device according to claim 2, wherein the first length and the second length are each of a constant size in the longitudinal direction.

5. The image heating device according to claim 1, wherein the flat surface portion is flush with the heater sliding surface.

6. The image heating device according to claim 1, wherein the flat surface portion is provided at a position further away from the second rotating member than the heater sliding surface in a pressure direction orthogonal to the longitudinal direction and the conveying direction; and wherein a height from the heater sliding surface to the flat surface portion in the pressure direction is 0.5 mm or less.

7. The image heating device according to claim 1, wherein the heater holder further has a protruding portion adjacent to the heater on an upstream side in the conveying direction, and the protruding portion is in contact with the inner peripheral surface of the first rotating member; and wherein the protruding portion protrudes toward the second rotating member from the heater sliding surface of the heater in a pressure direction orthogonal to the longitudinal direction and the conveying direction.

8. The image heating device according to claim 1, wherein the heater holder has a rotation guide portion that is in contact with the inner peripheral surface of the first rotating member on a downstream side from the slope portion in a rotation direction of the first rotating member, and the slope portion is not in contact with the first rotating member.

9. The image heating device according to claim 1, wherein the image heating device further includes a regulating member arranged to face both ends of the first rotating member, the regulating member being in contact with the inner peripheral surface of the first rotating member and guiding the rotation of the first rotating member; and wherein the regulating member is located on a side far from the second rotating member in a pressure direction orthogonal to the longitudinal direction and the conveying direction with respect to an inner peripheral surface of a locus drawn by the rotation of the first rotating member in a case in which the regulating member is not provided.

10. The image heating device according to claim 1, wherein the heater is in contact with the inner peripheral surface of the first rotating member with a lubricant interposed therebetween.

11. The image heating device according to claim 1, wherein the first rotating member is a tubular film, wherein the second rotating member is a pressure roller.

12. An image forming apparatus comprising:

an image forming portion that forms an image on a recording material; and a fixing portion that fixes the image formed on the recording material to the recording material, the fixing portion including:

a first rotating member capable of rotating;

a heater arranged in an internal space of the first rotating member, the heater heating the first rotating member;

a heater holder holding the heater, the heater holder being in contact with an inner peripheral surface of the first rotating member and guiding a rotation of the first rotating member; and a second rotating member that is capable of rotating and that is in contact with an outer peripheral surface of the first rotating member and forms a nip portion together the heater and the heater holder with the first rotating member interposed therebetween;

wherein the heater includes a heater seat surface contacting a seat surface of the heater holder and a heater sliding surface opposite to the heater seat surface and contacting the inner peripheral surface of the first rotating member, wherein the heater holder includes:

a flat surface portion protruding towards the second rotating member with respect to the heater seat surface on a downstream side of the heater sliding surface in a conveying direction of the recording material, which is flush with the heater sliding surface or is more distant from the second rotating member than the heater sliding surface and extends in parallel with the heater sliding surface; and a slope portion provided on the downstream side in the conveying direction of the flat surface portion, wherein the flat surface portion includes:

a first region which is a center portion of the heater holder in a longitudinal direction orthogonal to the conveying direction, a width of the first region in the conveying direction is a first length;

a second region located closer to an end portion of the heater in the longitudinal direction with respect to the first region and through which an end of the recording material in the longitudinal direction passes, a width of the second region in the conveying direction is a second length which is shorter than the first length, and a third region located between the first region and the second region, a width of the third region in the conveying direction gradually decreases with a transition from the first region to the second region, and wherein a position of a downstream end of the nip portion is located in the flat surface portion in an entire range in the longitudinal direction including the first region and the second region.

* * * * *